(12) United States Patent
Ciocarlie et al.

(10) Patent No.: US 10,107,612 B2
(45) Date of Patent: Oct. 23, 2018

(54) SYSTEMS AND METHODS FOR CONTACT LOCALIZATION THROUGH SPATIALLY OVERLAPPING SIGNALS

(71) Applicant: THE TRUSTEES OF COLUMBIA UNIVERSITY IN THE CITY OF NEW YORK, New York, NY (US)

(72) Inventors: Matei Ciocarlie, New York, NY (US); Ioannis Kymissis, New York, NY (US); Pedro Piacenza, New York, NY (US); Steve Jeung Hoon Park, Daejeon (KP)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/474,080

(22) Filed: Mar. 30, 2017

(65) Prior Publication Data
US 2017/0284787 A1    Oct. 5, 2017

Related U.S. Application Data

(60) Provisional application No. 62/316,260, filed on Mar. 31, 2016.

(51) Int. Cl.
*G01B 7/16* (2006.01)
*H01C 10/10* (2006.01)
(Continued)

(52) U.S. Cl.
CPC ............. *G01B 7/18* (2013.01); *B25J 13/084* (2013.01); *G01L 1/18* (2013.01); *H01C 1/14* (2013.01); *H01C 10/10* (2013.01)

(58) Field of Classification Search
CPC .......... H01C 10/10; H01C 1/14; B25J 13/084; G01B 7/18
(Continued)

(56) References Cited

U.S. PATENT DOCUMENTS

2011/0123100 A1*  5/2011  Carroll ................ G06F 19/3437
                                                                 382/155
2012/0312102 A1* 12/2012  alvarez ............... E21B 33/1208
                                                                 73/862.041
(Continued)

OTHER PUBLICATIONS

Alamusi et al., "Piezoresistive Strain Sensors Made from Carbon Nanotubes Based Polymer Nanocomposites," Sensors, 11, pp. 10691-10723 (2011).
(Continued)

*Primary Examiner* — Max Noori
(74) *Attorney, Agent, or Firm* — Wilmer Cutler Pickering Hale and Dorr LLP

(57) ABSTRACT

Achieving high spatial resolution in contact sensing for robotic manipulation often comes at the price of increased complexity in fabrication and integration. One traditional approach is to fabricate a large number of taxels, each delivering an individual, isolated response to a stimulus. In contrast, proposed sensor includes a continuous volume of soft material, e.g., a piezoresistive elastomer with a number of terminals embedded inside. Piezoresistive effects can be measured between all pairs of terminals in the set, and this rich signal set can contain the information needed to pinpoint contact location with high accuracy using regression algorithms. Submillimeter median accuracy can be demonstrated in locating contact on a 10 mm by 16 mm sensor using only four terminals (creating six unique pairs). In addition to extracting more information from fewer wires, this approach lends itself to simple fabrication methods and makes no assumptions about the underlying geometry, simplifying future integration on robot fingers.

19 Claims, 7 Drawing Sheets

(51) Int. Cl.
  H01C 1/14      (2006.01)
  B25J 13/08     (2006.01)
  G01L 1/18      (2006.01)
(58) Field of Classification Search
  USPC .......................................................... 73/763
  See application file for complete search history.

(56) References Cited

U.S. PATENT DOCUMENTS

| | | | |
|---|---|---|---|
| 2013/0031987 A1* | 2/2013 | Beauvais | A61B 5/1038 73/774 |
| 2016/0164433 A1* | 6/2016 | Won | H01L 41/0825 310/300 |
| 2016/0266616 A1* | 9/2016 | Chang | G06F 1/1683 |

OTHER PUBLICATIONS

Dahiya et al., "Tactile Sensing-From Humans to Humanoids," IEEE Transactions on Robotics, vol. 26, No. 1, pp. 1-20 (Feb. 2010).
Hammock et al., "25th Anniversary Article: The Evolution of Electronic Skin (E-Skin): A Brief History, Design Considerations, and Recent Progress," Advanced Materials, 25, pp. 5997-6038 (2013).
Alirezaei et al., "A tactile distribution sensor which enables stable measurement under high and dynamic stretch," IEEE Symposium on 3D User Interfaces 2009, pp. 87-93 (2009).
Argall and Billard, "Learning from demonstration and correction via multiple modalities for a humanoid robot," Proceedings of the International Conference Skills, pp. 1-4 (2011).
Begej, "Planar and finger-shaped optical tactile sensors for robotic applications," IEEE Journal of Robotics and Automation, vol. 4, No. 5, pp. 472-484 (1988).
Bekiroglu et al., "Assessing grasp stability based on learning and haptic data," IEEE Transactions on Robotics, vol. 27, No. 3, pp. 616-629 (2011).
Cannata et al., "Towards automated self-calibration of robot skin," 2010 IEEE International Conference on Robotics and Automation (ICRA), pp. 4849-4854 (2010).
Dang and Allen, "Grasp adjustment on novel objects using tactile experience from similar local geometry," IEEE/RSJ International Conference on Intelligent Robots and Systems (IROS), pp. 4007-4012 (2013).
Johnson and Adelson, "Retrographic sensing for the measurement of surface texture and shape," Computer Vision and Pattern Recognition (CVPR), pp. 1070-1077 (2009).
Kato et al., "Tactile sensor without wire and sensing element in the tactile region based on EIT method," Sensors, 2007 IEEE, pp. 792-795 (2007).
Lepora and Ward-Cherrier, "Superresolution with an optical tactile sensor," IEEE/RSJ International Conference on Intelligent Robots and Systems (IROS), pp. 2686-2691 (Sep. 2015).
Lepora et al., "Tactile superresolution and biomimetic hyperacuity," IEEE Transactions on Robotics, vol. 31, No. 3, pp. 605-618, 14 pages. (2015).
Muscari et al., "Real-time reconstruction of contact shapes for large area robot skin," 2013 IEEE International Conference on Robotics and Automation (ICRA), pp. 2360-2366 (2013).
Nagakubo et al., "A deformable and deformation sensitive tactile distribution sensor," 2007 IEEE International Conference on Robotics and Biomimetics (ROBIO 2007), pp. 1301-1308 (2007).
Patel and Correll, "Integrated force and distance sensing using elastomer-embedded commodity proximity sensors," Robotics: Science and Systems, 10 pages (2016).
Piacenza et al., "Contact localization through spatially overlapping piezoresistive signals," IEEE/RSJ Intl. Conf. on Intelligent Robots and Systems, 6 pages (2016).
Polygerinos et al., "MRI-compatible fiber-optic force sensors for catheterization procedures," IEEE Sensors Journal, vol. 10, No. 10, pp. 1598-1608 (2010).
Ponce Wong et al., "Haptic exploration of fingertip-sized geometric features using a multimodal tactile sensor," Proc. SPIE Defense, Security and Sensing/Sensing Technology and Applications Sensors for Next-Generation Robotics Conference, vol. 9116, pp. 911605-1-911605-15 (2014).
Saal et al., "Active estimation of object dynamics parameters with tactile sensors," 2010 IEEE/RSJ International Conference on Intelligent Robots and Systems (IROS), pp. 916-921 (2010).
Schneider et al., "Process and material properties of polydimethylsiloxane (PDMS) for optical MEMS," Sensors and Actuators A: Physical, vol. 151, No. 2, pp. 95-99 (2009).
Tanaka et al., "Object manifold learning with action features for active tactile object recognition," 2014 IEEE/RSJ International Conference on Intelligent Robots and Systems (IROS 2014), pp. 608-614 (2014).
Tawil et al., "Touch modality interpretation for an Eit-based sensitive skin," 2011 IEEE International Conference on Robotics and Automation (ICRA), pp. 3770-3776 (2011).
Tenzer et al., "The feel of MEMS barometers: Inexpensive and easily customized tactile array sensors," IEEE Robotics & Automation Magazine, vol. 21, No. 3, pp. 89-95 (2014).
van den Heever et al., "Tactile sensing using force sensing resistors and a super-resolution algorithm," IEEE Sensors Journal, vol. 9, No. 1, pp. 29-35, (Jan. 2009).
Wan et al., "Variability and predictability in tactile sensing during grasping," IEEE International Conference on Robotics and Automation, 7 pages (2016).
Wettels et al., "Biomimetic tactile sensor array," Adv. Robot., vol. 22, No. 8, pp. 829-849 (2008).
Yousef et al., "Tactile sensing for dexterous in-hand manipulation in robotics: A review," Sensors and Actuators A: Physical, vol. 167, No. 2, pp. 171-187 (2011).

* cited by examiner

SYSTEMS AND METHODS FOR CONTACT LOCALIZATION THROUGH SPATIALLY OVERLAPPING SIGNALS

CROSS-REFERENCE TO RELATED APPLICATIONS

This application claims priority under 35 U.S.C. § 119(e) to U.S. Provisional Patent Application No. 62/316,260 filed on Mar. 31, 2016, and entitled "Contact Localization Through Spatially Overlapping Piezoresistive Signals," the contents of which are hereby incorporated in their entirety by reference.

FIELD OF THE INVENTION

This invention relates to methods and systems for tactile sensing, and particularly, to methods and systems for tactile sensing using a soft material.

BACKGROUND

Tactile sensing methods for robotic manipulation, e.g., through a robotic hand, use sensors that employ various techniques, such as, piezoresistance, piezocapacitance, piezoelectricity, optics, and ultrasonics. Despite recent advances, prior art methods for robotic manipulation, however, have yet to provide robotic hands with increased sensitivity and abilities. Stand-alone tactile sensing demonstrated in testing conditions, e.g., individual tactile element ("taxel") testing on a workbench or laboratory, is not easily transferable to useful tactile-sensing integrated within a robotic hand. For example, even though tactile sensing arrays are designed to be flexible, conformable, and stretchable, other constraints, such as wiring, power consumption, robustness, manufacturability, and maintainability, make them cumbersome to use in a robotic hand, and especially difficult to integrate inside a robot finger. Inside a robotic hand, the sensor needs to be small, with very strict shape and packaging requirements, and needs to work over long periods of time in not perfectly controlled environments.

Accordingly, new and improved interfaces and/or interactions are desirable to achieve high-resolution sensing over relatively large areas of a robotic surface using sensors that can be amenable to integration inside a robot hand.

SUMMARY

According to aspects of the disclosure, a sensor is provided. The sensor can include a volume of soft material and a plurality of terminals embedded into the volume of soft material, forming one or more pairs of terminals. The sensor can be configured to detect a change in a signal for at least one pair of terminals in response to an indentation at a surface of the volume of soft material. The sensor can be further configured to estimate a location of the indentation at the surface of the volume of soft material based on the signal change for the at least one pair of terminals.

According to aspects of the disclosure, the volume of soft material is a piezoresistive material that comprises polydimethylsiloxane and carbon nanotubes. According to aspects of the disclosure, the percentage by weight of the concentration of carbon nanotubes and polydimethylsiloxane is between 0.2 and 5. According to aspects of the disclosure, the percentage by weight of the concentration of carbon nanotubes and polydimethylsiloxane is about 0.4. According to aspects of the disclosure, the carbon nanotubes are multiwall carbon nanotubes with purity of about 85%.

According to aspects of the disclosure, the sensor can further include a measuring circuit configured to measure a resistance value between the one or more pairs of electrodes. According to aspects of the disclosure, the baseline resistance of each of the one or more pairs of electrodes is measured when no pressure is applied to the volume of soft material. According to aspects of the disclosure, a first part of the volume of soft material has a first concentration of carbon nanotubes and polydimethylsiloxane and a second part of the volume of soft material has a second concentration of carbon nanotubes and polydimethylsiloxane. According to aspects of the disclosure, a concentration of carbon nanotubes in the first part of the volume of soft material is higher that a concentration of carbon nanotubes in the second part of the volume of soft material, and at least one electrode is embedded in the first part of the volume of soft material.

According to aspects of the disclosure, the plurality of terminals are embedded at random locations into the volume and the indentation at the surface of the volume of soft material changes a resistance between the at least one pair of terminals.

According to aspects of the disclosure, method is provided. The method can include the steps of providing a volume of soft material, embedding a plurality of terminals into the volume of soft material to form one or more pairs of terminals, and detecting a change in a signal for at least one pair of terminals in response to an indentation at a surface of the volume of soft material. According to aspects of the disclosure, the method can further include the step estimating a location of the indentation at the surface of the volume of soft material based on the signal change for the at least one pair of terminals. According to aspects of the disclosure, the method can further include measuring a resistance value between the one or more pairs of terminals.

According to aspects of the disclosure, method is provided. The method can include the steps of providing a volume of soft material, embedding a plurality of terminals into the volume of soft material to form one or more pairs of terminals, detecting a change in a signal for at least one pair of terminals in response to an indentation at a surface of the volume of soft material, and generating a mapping from the signal change to a property of the indentation at the surface of the volume of soft material. According to aspects of the disclosure, the property of the indentation corresponds to a location estimation of the indentation at the surface of the volume of soft material and the mapping comprises performing regression algorithms to identify the property of the indentation at the surface of the volume of soft material.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements. The following drawings are for illustration purposes only and are not intended to be limiting of the invention, the scope of which is set forth in the claims that follow.

DETAILED DESCRIPTION

The disclosed systems and methods address the problem of using a touch sensing modality, e.g., interface or interaction, to achieve high-resolution sensing over relatively large areas. Prior art methods typically use arrays of individual tactile elements ("taxels"). However, this approach requires at least one wire per taxel or, more typically, two wires per taxel, which suggests that an m-by-n taxel array requires 2*m*n wires for the array. If matrix addressing is used, at least m+n wires are required, however, this imposes regular geometry on the sensor. Additionally, the individual taxels of the array need to be properly isolated from each other, which in turn increases the manufacturing complexity. Accordingly, methods and systems are desirable to achieve high resolution tactile sensing, which can be easy to manufacture and can also cover non-regular, e.g., unspecified geometry.

Figure 1:
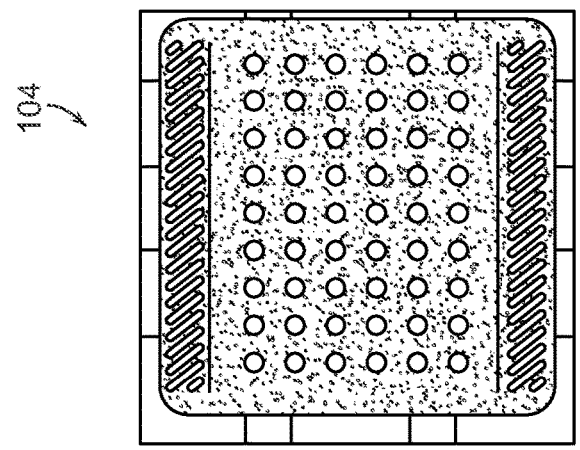
FIG. 1 illustrates a single, continuous volume of a piezoresistive polymer with multiple embedded electrodes, according to aspects of the disclosure.
Figure 1:
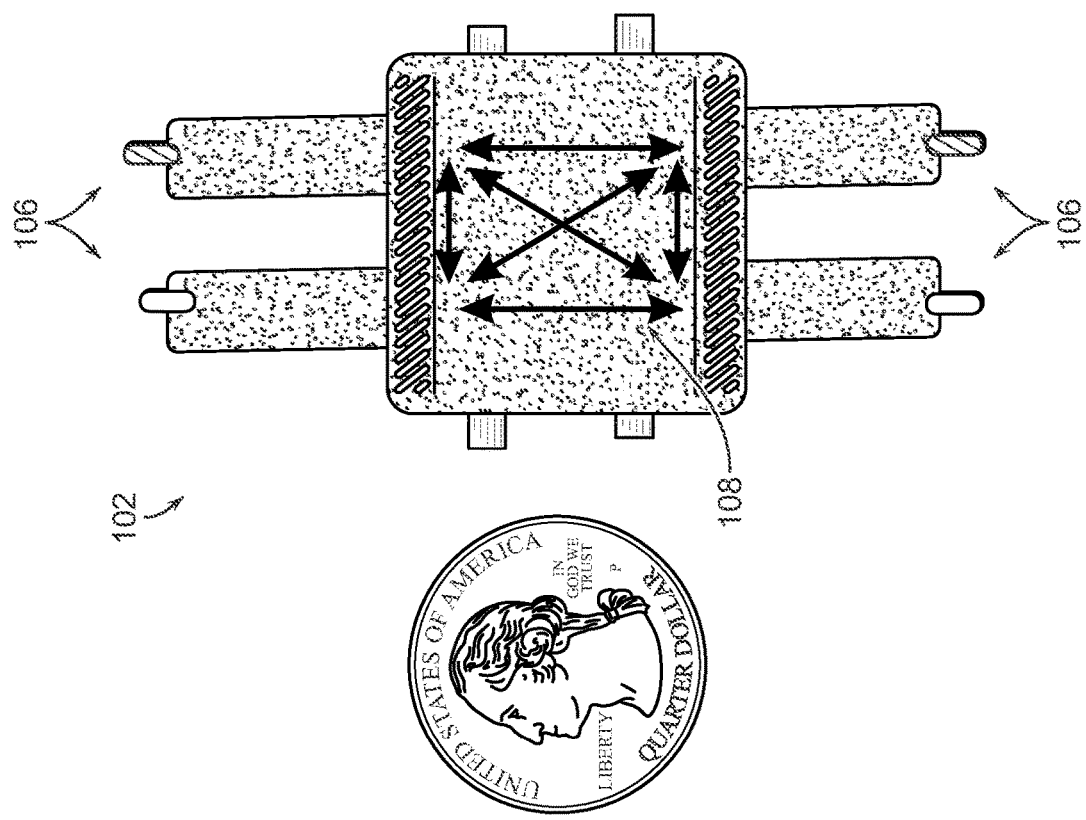

According to aspects of the disclosure, FIG. 1 illustrates a single, continuous volume of a soft material, e.g., piezoresistive polymer, which forms an exemplary sensor according to aspects of the disclosure. The top side 102 of the volume is shown, as well as four electrodes 106 embedded into the volume. The exemplary sensor of FIG. 1 has rectangular shape, where two of the four electrodes are connected to the volume of piezoresistive elastomer from one side, while the other two electrodes are connected to the volume of piezoresistive elastomer from the opposite side. When there is indentation in the piezoresistive polymer volume, there is resistance change between all electrode pairs, which are illustrated by the six arrows 108 in FIG. 1. The resistance change between all the electrode pairs due to the indentation can be measured. For example, an indentation anywhere on the surface of the piezoresistive polymer volume, can cause a resistance change in response to the strain, which can be measured between all the pairs of electrodes. This provides a number of signals that is quadratic in the number of wires, e.g., the four wires in the exemplary sensor of FIG. 1. According to aspects of the disclosure, grids of known measurements 104 can be used to learn a mapping from these signals to indentation location, as is discussed below. The example of FIG. 1 demonstrates a particular implementation of a signal change, e.g., due to a resistance change, between two terminals. A person of ordinary skill would understand that the concept of changing a signal between two terminals as a result of pressure on or touching the surface of the sensor, is not limited to resistance change. For example, a light signal can change between two terminals, e.g., due to a change in the light transmission between the two terminals, in response to pressure or touch on the surface of the sensor.

As discussed above, the disclosed systems and methods provide a great number of signals (quadratic in to number of wires) with fewer wires compared to prior art methods. Other advantages of the disclosed systems and methods relate to manufacturing-related aspects. For example, the disclosed sensor is a continuous volume of piezoresistive polymer that can be poured into a mold of arbitrary geometry, which means it can take any arbitrary shape. Accordingly, the disclosed methods provide simple fabrication of sensors that are well-suited for covering non-flat geometries. Moreover, in contrast to an array of taxels that requires isolation, there is no isolation requirement for the disclosed sensor.

According to aspects of the disclosure, the information carried by the signals from the electrodes can be processed to accurately determine a particular area of indentation. Specifically, the discloses methods can analytically determine using data-driven techniques different variables of interest from the relationship between each signal from the electrodes. Variables of interest can include for example, location of touch, depth of indentation, as a proxy for indentation force, force in varies directions, shape of the indenter tip. The disclosed methods can derive mapping information from signal information generated during indentation tests. The number of electrode pairs can provide many-to-few mapping to variables of interest, a mapping that can be effectively learned.

According to aspects of the disclosure, systems and methods are provided for localizing contacts on a touch sensor by measuring resistance changes between multiple, spatially overlapping electrode pairs.

According to embodiments, the disclosed method can deliver submillimeter median accuracy in determining contact position on a sensor, for example, with a 160 mm$^2$ effective area. According to an exemplary implementation, this can be achieved using only four wires that connect to the sensor, creating six electrode pairs, and without relying on a flat rigid substrate or circuit board, as shown, for example, at FIG. 1.

Tactile sensors implement transduction principles, such as, resistive, capacitive, optical, ultrasonic, magnetism-based, piezoelectric, tunnel effect etc. The disclosed systems and methods improve resolution compared to prior art methods without sacrificing manufacturability.

According to aspects of the disclosure, an elastomer is provided with dispersed conductive fillers applied to achieve piezoresistive characteristics. Embedding micro-channels of conductive fluids inside an elastic volume can be an effective alternative to making the entire volume conductive, especially if large strains are desirable. Exemplary systems can include single volume isotropic materials which can be directly molded into the desired shape.

Different methods for transducing the strain between a pair of terminals into an electric signal can also be used. For example, if one terminal is attached to a light-emitting device, and the other to a light measuring device, the strain between the terminals can be measured based on light propagation through the semi-transparent medium between them.

Regardless of the base transduction principle, attempts to increase spatial resolution have often resulted in the arrangement of multiple discrete sensors into a matrix to cover a given target surface. Some of these arrays can develop increased spatial resolution. However, a drawback of this approach is the difficulty involved in manufacturing these arrays onto a flexible substrate than can conform to complex surfaces. These techniques also suffer from wiring and manufacturing complexity, along with other system-level issues such as addressing and signal processing of multiple sensor elements, remain important roadblocks on the way to building complete sensing systems.

According to aspects of the disclosure, the proposed methods can maintain the manufacturability and simplicity of single-volume piezoresistive materials, while harvesting a large number of signals from pairs of electrodes embedded in the volume. According to aspects of the disclosure, the signals from the pairs of electrodes can be analytically characterized. According to aspects of the disclosure, the signals are not analytically characterized; rather, the disclosed methods learn the mapping between the signals from the pairs of electrodes and variables of interest. Machine learning for manipulation based on tactile data can discriminate between different types of geometric features based on the signals provided by a multimodal touch sensor.

Traditional tactile arrays can use a support vector machine (SVM) classifier to distinguish stable from unstable grasps in the context of robotic manipulation using, for example, a Barrett Hand, which provides tactile feedback through four arrays of 24 taxels. Other machine learning techniques can assess grasp stability based on tactile sensory data. In similar fashion, other machine learning techniques can use probabilistic models on tactile data to estimate object dynamics and perform object recognition. However, prior art methods are based on tactile arrays built on rigid substrates and thus unable to provide full coverage of complex geometry. In contrast, the disclosed methods are applied to the design of the sensor itself. Developing the sensor simultaneously with the learning techniques that make use of the data can achieve complete tactile systems.

According to aspects, the disclosed systems and methods can achieve high spatial resolution using a continuous volume of a soft material, e.g., a piezoresistive material, with several embedded electrodes within the volume. Molding a silicone elastomer into the desired shape allows embedding electrodes while the mixture is viscous, and allows covering complex, non-flat surfaces. To achieve piezo-resistance for the silicone, a conductive filler is dispersed, as detailed below. A switching circuit can sample the change in resistance between any pair of electrodes at high rates.

According to aspects, multiwall carbon nanotubes (MW-CNT) for example, with 85% purity, can be dispersed into polydimethylsiloxane (PDMS), a two-part silicone elastomer. One aspect of this process for achieving piezo-resistance is choosing the appropriate ratio of the conductive filler to the silicon elastomer. According to the percolation theory, the conductivity of the composite with regard to filler ratio displays an inflection near a point referred to as the percolation threshold. A composite with that ratio can also display the most pronounced piezoresistive effect. The discloses methods can find the percolation threshold of the materials used to build the sensor, trying different samples with concentrations of MWCNTs that vary from 0.2 wt. % to 5 wt. %. The most pronounced change in conductivity can occur around the threshold of 0.4 wt. %. The examples discussed below use this exemplary value for the ration of MWCNT to PDMS.

The disclosed methods can achieve uniform distribution of carbon nanotubes within PDMS, by using a chloroform as a common solvent, an approach referred to as the solution casting method. First, chloroform and MWCNT are added into a beaker and sonicate with a horn-type ultrasonicator in a pulse mode, for example, with 50% amplitude for 30 min to evenly disperse the MWCNTs into the chloroform. According to the disclosed methods, the PDMS is poured into the beaker, for example, at chloroform to PDMS weight ratio of 6:1 or more to reduce the viscosity of the whole mixture. Then the mixture can be stirred, for example, for 5 minutes to diffuse the PDMS into the solvent. The mixture can then be sonicated again, for example, for 30 minutes to disperse the MWCNTs into the PDMS. The mixture can be heated at an appropriate temperature, e.g., 80° C., for example, for 24 hours to evaporate the chloroform. After adding the curing agent, the mixture can be poured into the mold. For example, the examples discussed below the ration of the curing agent to the PDMS was one to twenty. Finally, the sample can be finished after curing in an oven at an appropriate temperature, e.g., 80° C., for a few hours, e.g., 4 hours. Techniques for mixing carbon nanotubes with PDMS are described in publications including, C. Alex and Z. Bao, "Skin-inspired electronic devices," Materials Today, vol. 17, no. 7, 2014.; J. Dusek, M. Triantafyllou, M. Woo, and J. Lang, "Carbon blackpdms composite conformal pressure sensor arrays for near-body flow detection," in IEEE OCEANS, 2014; D. Lipomi, M. Vosgueritchian, B. Tee, S. Hellstrom, J. Lee, C. Fox, and Z. Bao, "Skin-like pressure and strain sensors based on transparent elastic films of carbon nanotubes," Nature nanotechnology, vol. 6, no. 12, 2011; K. Kim, S. Hong, H. Cho, J. Lee, Y. Suh, J. Ham, and S. Ko, "Highly sensitive and stretchable multidimensional strain sensor with prestrained anisotropic metal nanowire percolation networks," Nano letters, vol. 15, no. 8, 2015; N. Hu, H. Fukunaga, S. Atobe, Y. Liu, and L. J., "Piezoresistive strain sensors made from carbon nanotubes based polymer nanocomposites," Sensors, vol. 11, no. 11, 2011; and C. Liu and J. Choi, "Improved dispersion of carbon nanotubes in polymers at high concentrations," Nanomaterials, vol. 2, no. 4, 2012, all of which are incorporated by reference herein in their entirety.

Figure 2:
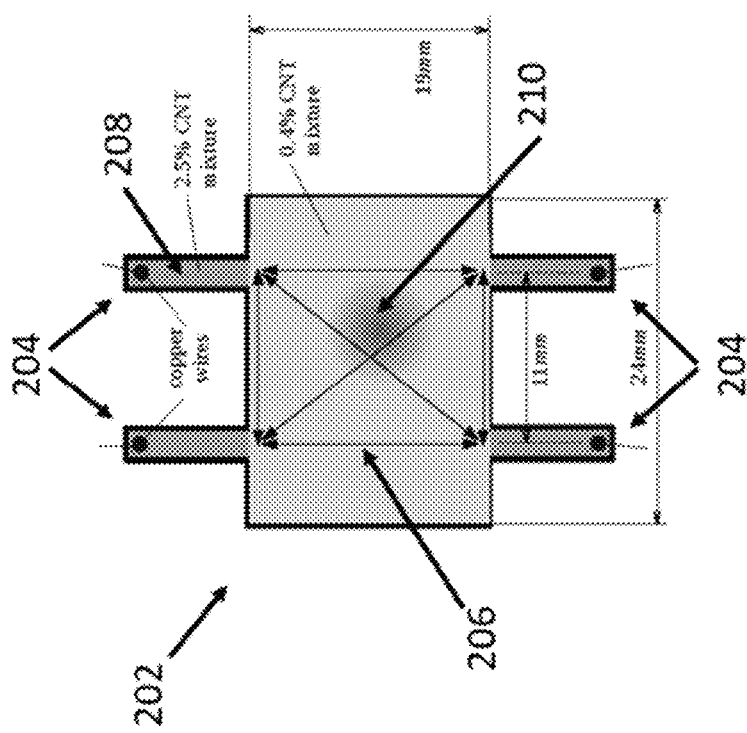
FIG. 2 illustrates an exemplary sensor with piezoresistive Polydimethylsiloxane (PDMS)/carbon nanotube (CNT) mixture, according to aspects of the disclosure.

According to aspects of the disclosure, FIG. 2 illustrates an exemplary sensor 202 with a piezoresistive PDMS and CNT mixture. The exemplary sensor of FIG. 2 can be used to measure the resistance through a volume of the piezoresistive PDMS and CNT mixture between multiple pairs of terminals 206, e.g., four terminals (204) as illustrated. To isolate the piezoresistive effects from the mechanical changes at the terminals due to indentation, the wire contacts of the terminals are mechanically separated from the piezoresistive sample placed under indentation tests. For example, side channels (208) can be extended from the sample, each filled with a CNT-filled PDMS mixture with a higher CNT concentration of 2.5 wt. %. Then copper wires can be embedded directly into the mixture at the end of these channels, as shown in FIG. 2, to form the terminals (204). For a given indentation, which is illustrated by a circular pattern 210, the change in the resistance between all six terminal pairs 206 can be measured. The mixture with the ratio of 2.5 wt. % has no piezoresistive characteristics and its conductivity is close to that of the copper wires; thus, the mixture with the ratio of 0.4 wt. % located at the center of the mold dominates the overall conductivity, and would be responsible for the change in the resistance between the terminal pairs. The dimensions of the sensor 202 are exemplary and a different shaped sensor can be used to measure the resistance between the terminal pairs.

According to aspects of the disclosure, a measuring circuit can measure the change in resistance between pairs of electrodes/terminals that occurs as a result of indentation on the sensor because of a strain applied to the piezoresistive mixture. The resistance change depends on the amount of the applied strain, and can be, for example, about 5% of the nominal value of the resistance at rest, e.g., when no strain is applied. Each pair of terminals can have different resistance values at rest, which depends, for example, on the shape and geometry of the piezoresistive mixture, and the placement of the terminals in the mixture. The disclosed methods can benefit from sampling these relatively small changes in resistance at a high enough rate such that a set of all measurements across terminals can be representative of the instantaneous strain applied.

Figure 3:
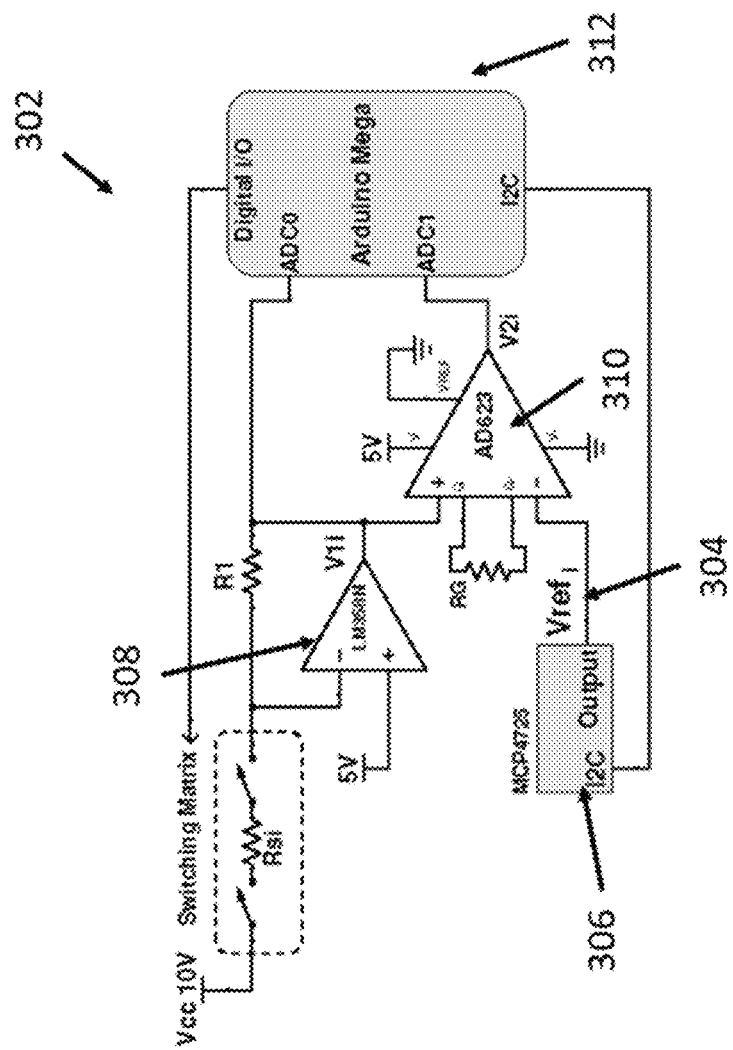
FIG. 3 illustrates an exemplary measuring circuit according to aspects of the disclosure.

FIG. 3 shows a measuring circuit 302 according to embodiments of the present invention. For illustrative purposes, $R_{si}$ can represent the resistance across the i-th terminal pair that is of interest in measuring. For the illustrative example of FIG. 2, there are six terminal pairs, which means that i can be an integer number between one and six, e.g., i∈{1, 2, 3, 4, 5, 6}. For every terminal pair with a resistance $R_{si}$ a measurement of the voltage between the corresponding pair, $V_{1i}$, can be taken with the sample at rest. The measured voltage can then be reproduced as a reference voltage, $V_{ref_i}$ 304, using a digital-to-analog converter 306, such that the change of $V_{1i}$ is amplified when the sample is indented. As shown in FIG. 3, a first stage is used with a simple operational amplifier 308 in inverting configuration in a way that guarantees an output $V_{1i}$ between 0 and 5 volts such that it can be directly measured by the microcontroller analogue to digital converter module (ADC) 312. The output of the first stage (308), $V_{1i}$, is given by equation 1

$$V_{1i} = 5V - 5V\left(\frac{R_1}{R_{si}}\right) \quad (1)$$

Since the change in the resistance $R_{si}$ can be small, the change in the output voltage $V_{1i}$ from this first stage can also be small. The value of $R_1$ can be smaller than any of the values $R_{si}$, and the sensitivity of $V_{1i}$ with respect to $R_{si}$ changing increases as the value of $R_1$ is closer to those of $R_{si}$.

Because the absolute value of $V_{1i}$ is not of interest, rather its change over time when strain is applied to the piezoresistive volume, a baseline measurement of $V_{1i}$ is used when the sensor rests. These baseline measurements can be used as the values of $V_{ref_i}$ that are held on the negative input of an instrumentation amplifier 310 for the second stage of the circuit. This allows to remember the undisturbed value of $V_{1i}$, compare it with the current one, and amplify that difference. The voltage $V_{ref_i}$ can be provided in the circuit by a digital to analog converter 306.

Figure 4:
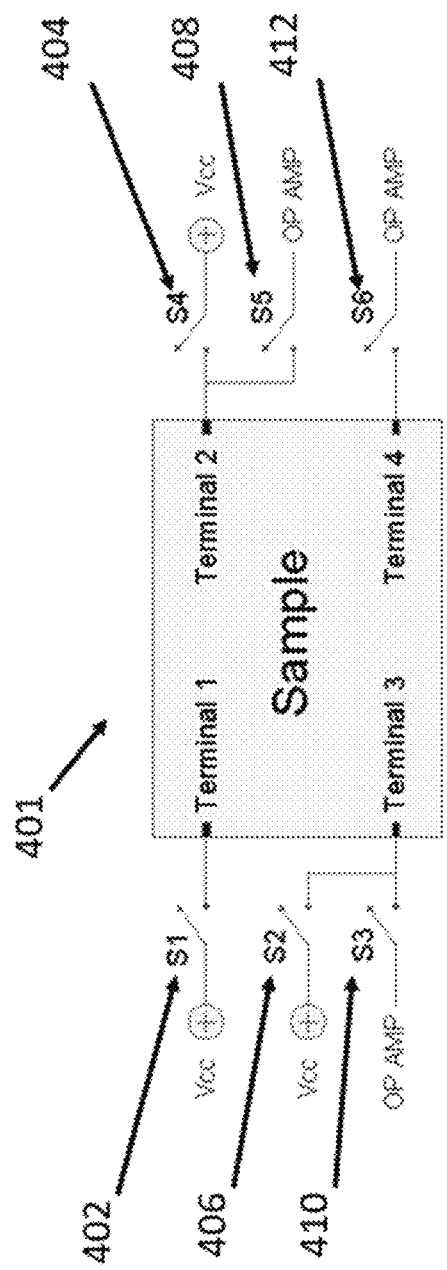
FIG. 4 illustrates an exemplary switching matrix, according to aspects of the disclosure.

FIG. 4 shows an exemplary switching matrix 401, according to aspects of the disclosure. The switching matrix of FIG. 4 has six switches (402, 404, 406, 408, 410, 412), which allow measuring the resistance across any combination of terminals, T1 through T4. All six switches can be controlled with digital signals from the microcontroller 312. The switches can be closed such that there is always a connection between one terminal to Vcc and the other terminal to the inverting input of the operational amplifier. The overall circuit can deliver the set of all six $V_{2i}$ values (output of 310) every 25 milliseconds, resulting in a 40 Hz sampling frequency. This value is deliberately conservative, since the only bottleneck on how fast the matrix can switch is down to the speed of the ADC module.

Figure 5:
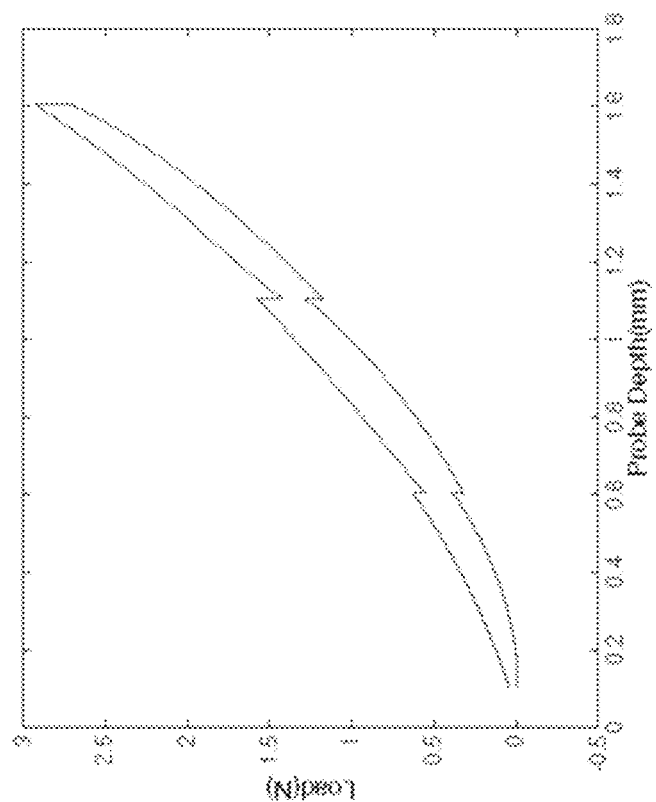
FIG. 5 illustrates shows a plot of the load for different probe depth values for the CNT-filled PDMS samples, according to aspects of the disclosure.

To collect training and testing data, the sample can be indented at a series of known locations and to a known depth. The sample can be placed on a planar stage and can be indented vertically using a linear probe. A hemispherical indenter tip can be used, for example, with a 6 mm diameter printed in ABS plastic. All indentations can be position-controlled relative to the surface of the sample. The indentations can be determined manually by lowering the probe until contact is observed. According to aspects of the disclosure, the disclosed system does not include a force sensor; in such case, the indentation depth can be used as a proxy for force. FIG. 5 shows a graph illustrating a plot of the load (force in N) for different indentation depth for exemplary CNT-filled PDMS samples, in loading and unloading regimes, determined separately using a testing machine. For the testing in connection with FIG. 5, the measurements were taken by advancing or retracting the probe in steps of 0.5 mm separated by 30 s pauses.

According to aspects of the disclosure, for indentation locations, two patterns can be used. A first pattern, a grid indentation pattern, can consists of a regular 2D grid of indentation locations, spaced 2 mm apart along each axis. However, the order in which grid locations were indented was randomized. A second pattern, a random indentation pattern, can include locations of indentations that are sampled randomly over the surface of the sample, without following any pattern.

For each indentation location, the signal can be sampled from each pair of electrodes at multiple indentation depths. Each such measurement can result in a tuple of the form $\Phi_i = (x_i, y_i, d_i, r_i^1, \ldots, r_i^6)$, where $x_i$ and $y_i$ represent the location of the indentation, $d_i$ is the indentation depth, and $r_i^1, \ldots r_i^6$ (also referred to collectively as $r_i$) represent the change in the six resistance values are measured between depth $d_i$ and depth 0 (the probe on the surface of the sample). These tuples can be used for data analysis as described below.

According to embodiments, a goal for performing the tests is to learn the mapping from all terminal pairs readings r to the indentation location (x, y). To train a predictor, four data sets were collected in regular grid patterns, totaling 216 indentations. For testing, a dataset consisting of 60 indentations in a random pattern was collected. All indentations were performed to a depth of 3 mm, or 50% of the total width of the sample. The metric used to quantify the success of this mapping is the magnitude of the error (in mm) between the predicted indentation position and ground truth. In the analysis that follows, the error is reported for individual test points, as well as its mean, median and standard deviation over the complete testing set.

The baseline that the results were compared against includes a "center predictor" and a "random predictor". The former can predict the location of the indentation on the center of the sample, and the later will predict a completely random location within the sample surface. According to aspects of the disclosure, the useful area of an exemplary sample that was tested is 16 mm by 10 mm. The center predictor can produce a median error of 5 mm, while the random predictor, if given a large test set, can converge on a median error of about 6 mm.

Linear regression can be used as the learning method. The results can be better than the baseline, with a median error of under 2 mm. Still, visual inspection of the magnitude and direction of the errors revealed a circular bias towards the center that was attempted to be compensated for with a different choice of learning algorithm. Another regression algorithm can be a ridge regression with a Laplacian kernel. The Laplacian kernel can be a simple variation of the ubiquitous radial basis kernel, which explains its ability to remove the non-linear bias noticed in linear regression results. In this case, the first half of the training data was used for training the predictor, and the second half was used to calibrate the ridge regression tuning factor λ and the kernel bandwidth σ through grid search.

The numerical results using both of the predictors, as well as the two baseline predictors, are summarized in Table I. These results are aggregated over the complete test set consisting of 60 indentations. Linear regression identifies the location of the indentation within 2 mm on average, while Laplacian ridge regression ($\lambda=2.7e^{-2}$, $\sigma=6.15e^{-4}$) further improves this results achieving sub-millimeter median accuracy.

TABLE I

Prediction Accuracy for Indentation Location

| Predictor | Median Err. | Mean Err. | Std. Dev. |
| --- | --- | --- | --- |
| Center predictor | 5.00 mm | 5.13 mm | 2.00 mm |
| Random predictor | 6.30 mm | 6.70 mm | 3.80 mm |
| Linear regression | 1.75 mm | 1.75 mm | 0.83 mm |
| Laplacian ridge regression | 0.97 mm | 1.09 mm | 0.59 mm |

Figure 6:
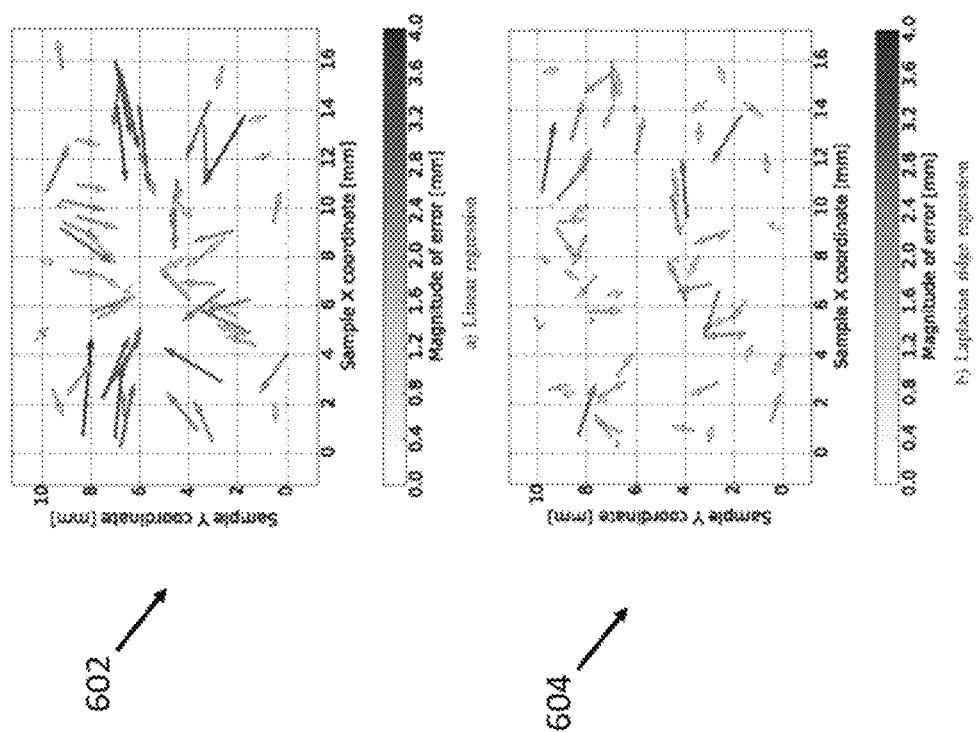
FIG. 6 illustrates graphs of the magnitude and direction of the localization error for an exemplary test set, according to aspects of the disclosure.
Figure 7:
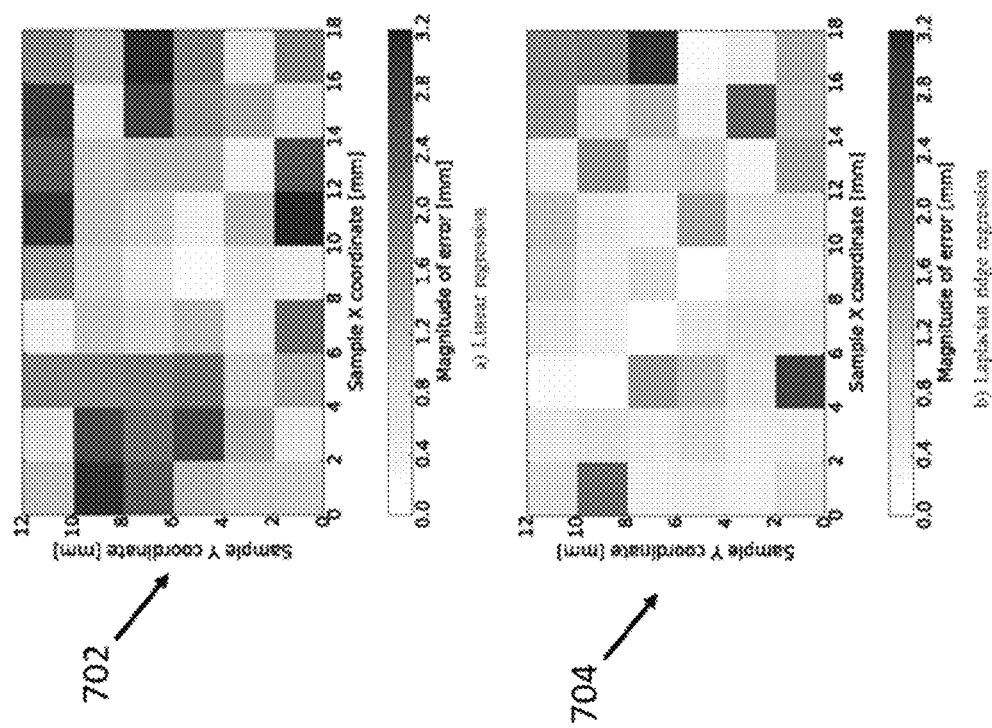
FIG. 7 illustrates heatmap graphs of the localization error magnitude based on the indentation location, according to aspects of the disclosure.

In addition to the aggregate results shown in Table I, FIG. 6 illustrates the magnitude and direction of the localization error for the entire test set, for Linear regression (602) and Laplacian regression (604). Each arrow represents one indentation in the test set. The base of the arrow is at the ground truth indentation location while the tip is at the predicted location. To characterize localization error uniformly over the entire sample, a separate analysis was performed where the test set also consisted of a regular grid of indentations (in this case, only three such grids for training were used and the fourth one for testing). This allows to plot localization error as a function of position on the surface of the sample; the results are shown in FIG. 7. Specifically, FIG. 7 shows a heatmap of the localization error magnitude based on indentation location, for Linear regression (702) and Laplacian regression (704). Again the predictor using Laplacian ridge regression achieves high accuracy throughout most of the sample's area, with larger errors occurring on the edges. This pattern can be explained by the fact that an indentation closer to the center is likely to produce a meaningful signal for more electrode pairs compared to an indentation at the edge.

The results support high accuracy spatial resolution can be achieved for contact determination over a large sensor area based on a small number of signals collected from spatially overlapping electrode pairs. The disclosed sensor, which in the example of FIG. 2 is built having a rectangular shape with an effective sensing area of 10 mm by 16 mm, can discriminate contact location with submillimeter median accuracy, which is the equivalent of 160 individual taxels used in prior art methods. Even assuming worst-case accuracy throughout the sensor, the disclosed methods can still locate contact within 3 mm, the equivalent of 15 taxels used in prior art methods. As explained above this can be achieved by measuring the resistance change between 6 electrode pairs, provided by only four wires.

According to aspects of the disclosure, the disclosed methods and systems can discriminate contact force or indentation depth. Additional variables of interest can include, for example, planar shear forces, and torsional friction, etc. Other aspects such as repeatability, hysteresis, lifespan, sensitivity to environmental factors, etc., can be determined by the properties of the underlying transducing modality.

According to aspects of the disclosure, the number of variables that can be determined, and the accuracy that they can be determined with, can depend on the raw data that can be harvested from the sensor. In this example of FIG. 2, the results were presented using four electrodes, thus creating six unique pairs. The number of pairs can increase quickly with the number of electrodes. For example, eight electrodes can produce twenty eight pairs, while twelve electrodes can yield sixty six pairs. A person of ordinary skill would understand that not all electrode pairs can be sensitive to all indentations, especially if the electrodes are distributed over a large area. Still, the results presented herein illustrate that it is possible to capture a rich description of the contact with the sensor using the disclosed methods. A person of ordinary skill would understand that other methods, e.g., deep learning approaches, can be used for learning the mapping between the change in resistance and a particular indentation.

According to aspects of the disclosure, the systems and sensors can have irregular geometry. The disclosed methods can be agnostic to how changes between electrodes are detected. According to other aspects of the disclosure, knowledge about the particular geometry of the sensor and information about the placement of the electrodes in the sensor can help reducing the complexity of the analysis and/or increasing the resolution of the system. For example, electrodes can be selectively placed in locations of the sensor where it is expected and desired to have higher resolution.

Different material can be used for building the sensor, based, for example, on the type of the application the sensor is used for. For example, a harder material can be used to build a mat that can detect how a person stands on the map, compared to the material for a sensor used for robotic manipulation. According to other aspects of the disclosure, the disclosed systems and methods can be used for temperature sensing. For example, changes in the volume of a polymer used as a sensor, based on the ambient temperature can provide information about the change in temperature. In addition, a sensor can comprise more than one types of material that respond differently to temperature changes.

The invention claimed is:

1. A sensor for comprising:
   a volume of soft material; and
   a plurality of terminals embedded into the volume of soft material, forming one or more pairs of terminals;
   wherein the sensor is configured to detect a change in a signal for at least one pair of terminals in response to an indentation at a surface of the volume of soft material;
   wherein a first part of the volume of soft material has a first concentration of carbon nanotubes and polydimethylsiloxane and a second part of the volume of soft material has a second concentration of carbon nanotubes and polydimethylsiloxane.

2. The sensor of claim 1, wherein the sensor is further configured to estimate a location of the indentation at the surface of the volume of soft material based on the signal change for the at least one pair of terminals.

3. The sensor of claim 1, wherein the carbon nanotubes are multiwall carbon nanotubes with purity of about 85%.

4. The sensor of claim 1, further comprising a measuring circuit configured to measure a resistance value between the one or more pairs of terminals.

5. The sensor of claim 1, wherein a baseline resistance of each of the one or more pairs of terminals is measured when no pressure is applied to the volume of soft material.

6. The sensor of claim 1, wherein a concentration of carbon nanotubes in the first part of the volume of soft material is higher that a concentration of carbon nanotubes in the second part of the volume of soft material, and at least one terminal is embedded in the first part of the volume of soft material.

7. The sensor of claim 1, wherein the plurality of terminals are embedded at random locations into the volume.

8. The sensor of claim 1, wherein the indentation at the surface of the volume of soft material changes a resistance between the at least one pair of terminals.

9. A method comprising:
providing a volume of soft material;
embedding a plurality of terminals into the volume of soft material to form one or more pairs of terminals; and
detecting a change in a signal for at least one pair of terminals in response to an indentation at a surface of the volume of soft material;
wherein a first part of the volume of soft material has a first concentration of carbon nanotubes and polydimethylsiloxane and a second part of the volume of soft material has a second concentration of carbon nanotubes and polydimethylsiloxane.

10. The method of claim 9, further comprising estimating a location of the indentation at the surface of the volume of soft material based on the signal change for the at least one pair of terminals.

11. The method of claim 9, wherein the carbon nanotubes are multiwall carbon nanotubes with purity of about 85%.

12. The method of claim 9, further comprising measuring, by a measuring circuit, a resistance value between the one or more pairs of terminals.

13. The method of claim 9, wherein a baseline resistance of each of the one or more pairs of terminals is measured when no pressure is applied to the volume of soft material.

14. The method of claim 9, wherein a concentration of carbon nanotubes in the first part of the volume of soft material is higher that a concentration of carbon nanotubes in the second part of the volume of soft material, and at least one terminal is embedded in the first part of the volume of soft material.

15. The method of claim 9, wherein the plurality of terminals are embedded at random locations into the volume.

16. The sensor of claim 9, wherein the indentation at the surface of the volume of soft material changes a resistance between the at least one pair of terminals.

17. A method comprising:
providing a volume of soft material;
embedding a plurality of terminals into the volume of soft material to form one or more pairs of terminals;
detecting a change in a signal for at least one pair of terminals in response to an indentation at a surface of the volume of soft material; and
generating a mapping from the signal change to a property of the indentation at the surface of the volume of soft material;
wherein a first part of the volume of soft material has a first concentration of carbon nanotubes and polydimethylsiloxane and a second part of the volume of soft material has a second concentration of carbon nanotubes and polydimethylsiloxane.

18. The method of claim 17, wherein the property of the indentation corresponds to a location estimation of the indentation at the surface of the volume of soft material.

19. The method of claim 17, wherein the mapping comprises performing regression algorithms to identify the property of the indentation at the surface of the volume of soft material.

* * * * *